United States Patent
Smela et al.

(10) Patent No.: US 8,383,226 B2
(45) Date of Patent: Feb. 26, 2013

(54) STRUCTURES AND METHODS FOR INCREASING THE SPEED OF ELECTROACTIVE POLYMERS

(75) Inventors: Elisabeth Smela, Silver Spring, MD (US); Xuezheng Wang, New Castle, DE (US)

(73) Assignee: University of Maryland, College Park, MD (US)

( * ) Notice: Subject to any disclaimer, the term of this patent is extended or adjusted under 35 U.S.C. 154(b) by 675 days.

(21) Appl. No.: 10/592,266

(22) PCT Filed: Mar. 3, 2005

(86) PCT No.: PCT/US2005/006776
§ 371 (c)(1),
(2), (4) Date: Sep. 8, 2006

(87) PCT Pub. No.: WO2005/092605
PCT Pub. Date: Oct. 6, 2005

(65) Prior Publication Data
US 2007/0205398 A1 Sep. 6, 2007

Related U.S. Application Data
(60) Provisional application No. 60/552,571, filed on Mar. 12, 2004.

(51) Int. Cl.
*B32B 3/10* (2006.01)
*H01B 1/24* (2006.01)
(52) U.S. Cl. ............... 428/131; 428/315.5; 428/315.7; 252/511

(58) Field of Classification Search ............. 428/131, 428/315.5, 315.7
See application file for complete search history.

(56) References Cited

U.S. PATENT DOCUMENTS

| | | | |
|---|---|---|---|
| 6,096,453 A | 8/2000 | Grunwald | |
| 6,201,100 B1 | 3/2001 | Gorkovenko et al. | |
| 6,372,387 B1 * | 4/2002 | Kawakami et al. | 429/303 |
| 6,391,471 B1 | 5/2002 | Hiraoka et al. | |
| 6,464,904 B1 * | 10/2002 | Hirose et al. | 252/62.2 |
| 6,471,993 B1 * | 10/2002 | Shastri et al. | 424/486 |
| 6,492,014 B1 | 12/2002 | Rolison et al. | |
| 6,552,883 B1 * | 4/2003 | Grigorov et al. | 361/19 |
| 2003/0077515 A1 * | 4/2003 | Chen et al. | 429/231.8 |
| 2003/0173612 A1 * | 9/2003 | Krieger et al. | 257/304 |
| 2004/0143063 A1 * | 7/2004 | Chen et al. | 525/131 |
| 2004/0185324 A1 * | 9/2004 | Bettelheim et al. | 429/41 |

OTHER PUBLICATIONS

English Abstract of KR 2003014895 A, Jang et al, "Portable Fuel Cell System," Feb. 20, 2003, 3 pages.*
A complete translation of KR 2003-0014895, Lee et al, "Portable Fuel Cell System", Feb. 20, 2003.*

* cited by examiner

*Primary Examiner* — Hai Vo
(74) *Attorney, Agent, or Firm* — Squire Sanders (US) LLP

(57) ABSTRACT

Structures are provided that include electroactive polymers. According to these structures, the electroactive materials have enhanced conductivity in a first direction. Also, the structures include either pores or inclusions. These pores or inclusions are non-parallel to the first direction. In addition, methods for forming structures that include electroactive polymers that have enhanced conductivity in a first direction are provided. These methods allow for pores and/or inclusions to be formed in the electroactive polymers.

16 Claims, 7 Drawing Sheets

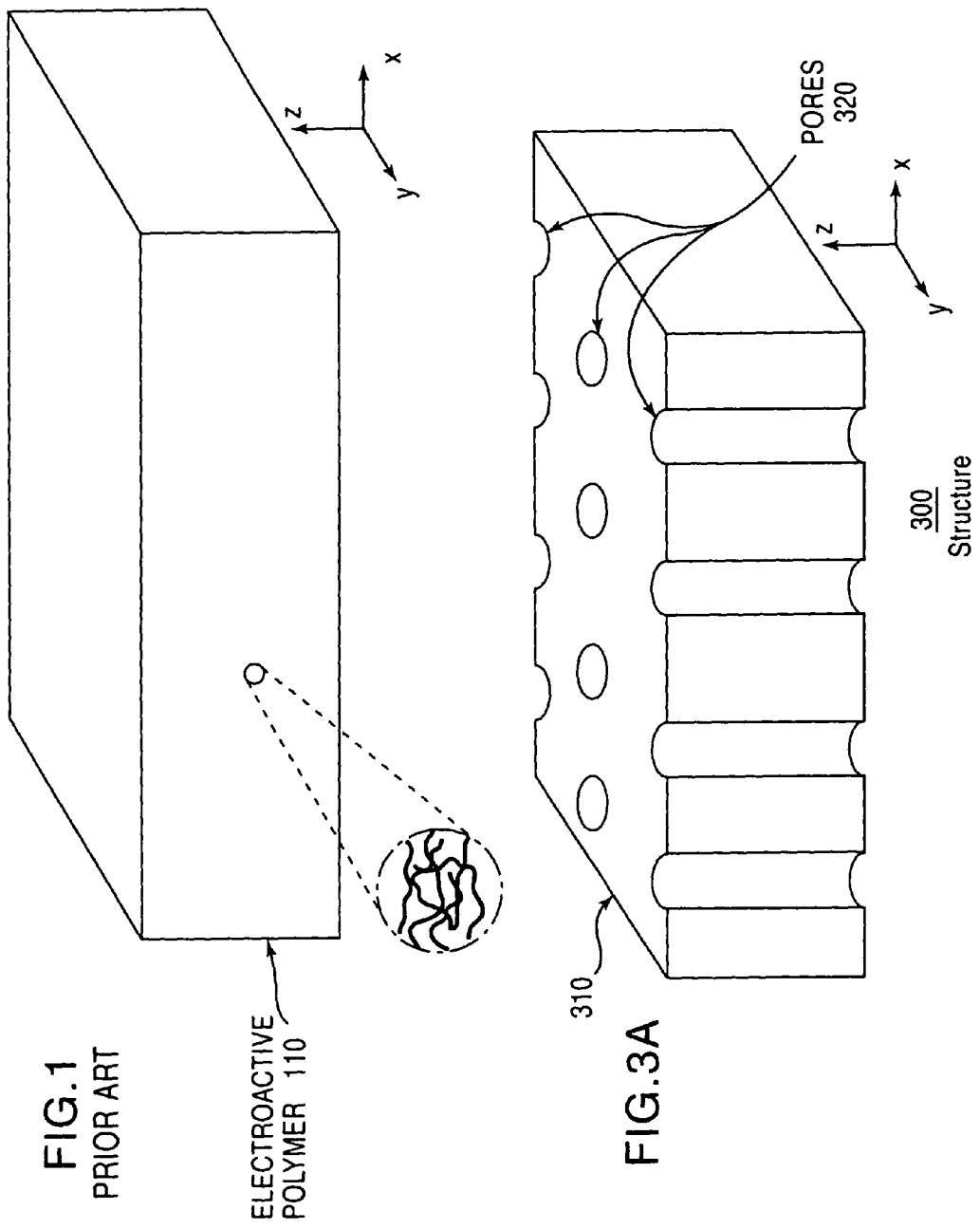

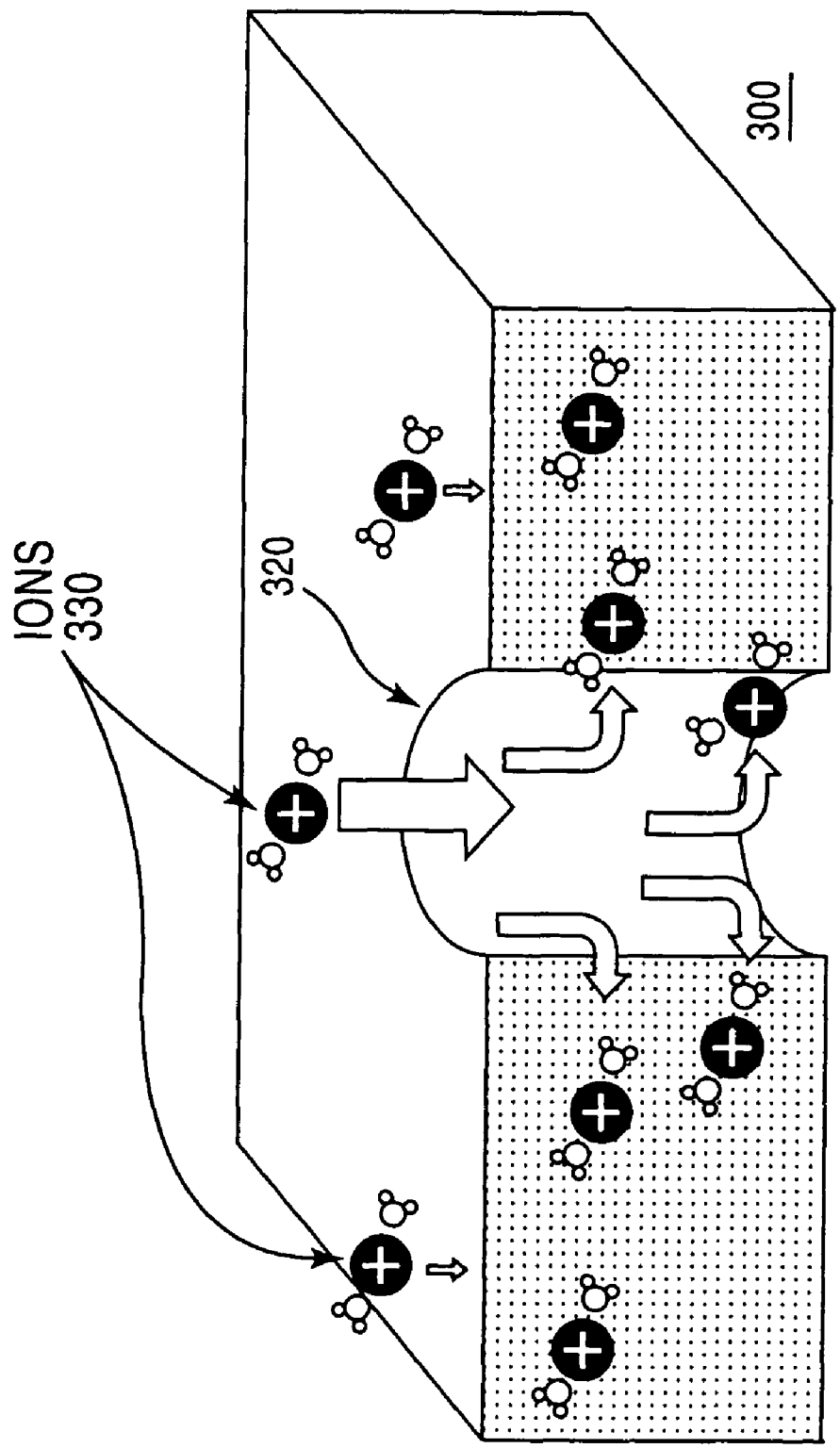

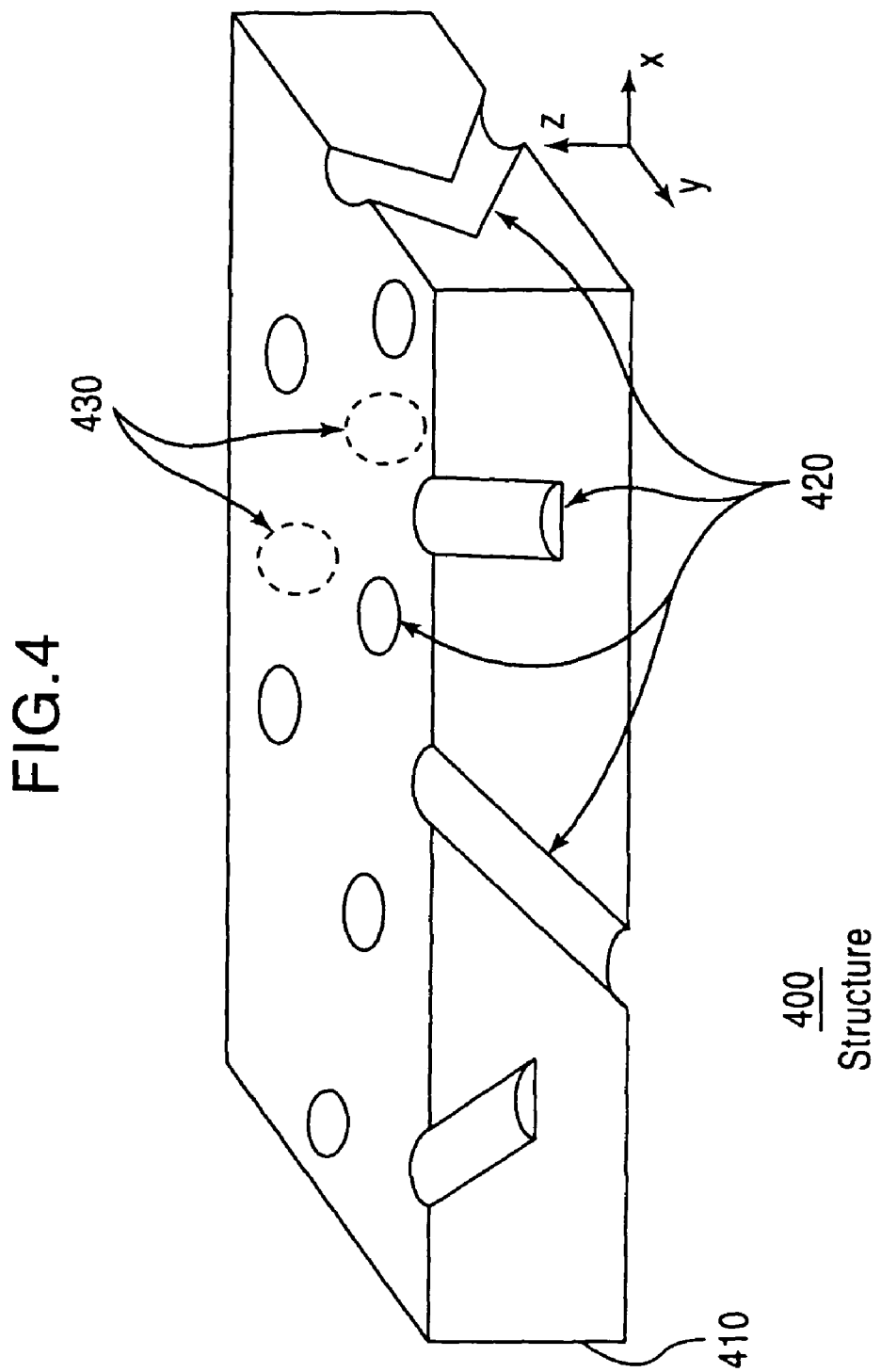

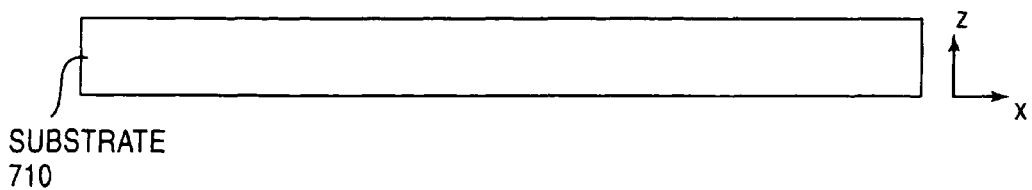

STRUCTURES AND METHODS FOR INCREASING THE SPEED OF ELECTROACTIVE POLYMERS

CROSS REFERENCE TO RELATED APPLICATIONS

The present application claims priority of U.S. Provisional Patent Application Ser. No. 60/552,571, entitled "Structure for Increasing the Speed of Electroactive Materials", filed on Mar. 12, 2004. The contents of this Provisional Patent Application are hereby incorporated herein by reference.

BACKGROUND OF THE INVENTION

1. Field of the Invention

The present invention relates generally to electroactive polymer structures and to devices that include electroactive polymers. The present invention also relates generally to methods for forming electroactive polymers, structures that include electroactive polymers, and devices that include electroactive polymers.

2. Description of Related Art

Generally, electroactive materials are defined as those materials which experience a change or otherwise "react" when influenced by an electric field or current. For example, some electroactive materials are piezoelectric and mechanically deform when exposed to an electric field. As such, currently available electroactive materials can be included in sensors, displays, actuators, batteries, and a variety of other devices.

Two families of polymeric electroactive materials have been developed: electronic electroactive polymers and ionic electroactive polymers. In ionic electroactive polymers, ion motion is associated with the electroactive effect, which can include volume change, color change, conductivity change, charge storage, and drug delivery. Members of the ionic electroactive polymer family include conjugated polymers, ionic polymer metal composites (IPMCs) (though the polymer membrane itself is not electroactive), gels (although not all gels respond electrically), and carbon nanotubes (although these are not polymers). In the present specification, the term "ionic electroactive polymer" may refer to any or all of these materials.

Typically, ionic electroactive polymers are formed as, and are used in the form of, films. Ionic electroactive polymer films typically have anisotropic physical and/or chemical structures and, as a result, possess anisotropic properties. For example, ionic electroactive polymer films may have anisotropic mechanical, electrical, and/or electrochemical properties, etc. FIG. 1 illustrates a representative electroactive polymer material 110 according to the prior art that is both polymeric and anisotropic.

As illustrated in the portion of FIG. 1 that illustrates a magnified portion of material 110, most of the polymer chains that make up material 110 have their backbones oriented along planes that are parallel to the top and bottom surfaces of material 110. In other words, there is relatively less cross-linking and/or chain orientation in the z-direction than in the x- and y-directions, in this example material.

Therefore, ions and/or other mass (e.g., solvent) may be transported more easily through material 110 in either the x-direction or the y-direction, since steric hindrance is relatively low, than in the z-direction. In other words, an ion moving through material 110 would run into fewer polymer chain backbones or crosslinks when moving in either the relatively "open" x- or y-directions than when moving in the z-direction.

As an alternative to the structure illustrated in FIG. 1, electroactive polymer material 110 may include monomer units that are oriented preferentially parallel to a substrate on which a film of material 110 is formed but with no preferential chain alignment. In the case of conjugated polymers with aromatic rings, the rings lie parallel to the surface of the material, which leads to transport anisotropy. Also, material 110 may be anisotropic if it includes crystalline regions with aromatic rings that are stacked face-to-face.

Anisotropic electroactive polymers, such as those found in material 110, commonly develop their anisotropy upon formation. For example, when an ionic electroactive polymer film is formed on a substrate, the surface properties of the substrate typically cause a majority of the backbones and/or aromatic rings of the polymer chains that make up the film to orient themselves in planes that are parallel to the substrate surface. Then, as more polymer chains are deposited to increase the thickness of the film, a majority of the backbones/rings of the additional polymer chains also orient themselves in such planes.

In some conjugated polymers, dopants have been found to facilitate anisotropy and/or ordering. For example, as illustrated in FIGS. 2A-2C, surfactant dopants 200 cause layering of polymer chains 210 within a polymer. Although not illustrated, aromatic dopants may also be used to promote stacking of conjugated polymer rings with the dopant rings and with each other. Further, liquid crystalline materials may also be used to order polymeric materials. In addition, in other ionic electroactive materials, additives can be used to facilitate anisotropy and/or ordering. Such additives may include surfactants and/or liquid crystals.

As illustrated in FIG. 2B, ion 220 may travel relatively easily in the xy-plane, which is relatively open. However, as illustrated in FIG. 2C, ion 220 has substantially more difficulty traveling in the yz-plane, due to steric hindrance. Therefore, the structures illustrated in FIGS. 2A-C have a higher degree of ionic conductivity in the xy-plane than in the yz-plane.

Those of skill in the art are aware that currently-available ionic electroactive polymers have a number of limitations that limit the types of applications in which they may be used. For example, it is well established that currently-available ionic electroactive polymer actuators suffer from having relatively long response times because their response is limited by the rate of ion and/or other mass transport through the material. Therefore, as the material becomes thicker, the speed of response of the device slows.

In order to minimize the response times of currently-available electroactive polymers, two methods have been employed. According to the first method, a high voltage is applied to the polymer or a high constant current density is used. However, high voltages and/or currents increase the likelihood that either the electroactive polymer, or an electrolyte contained therein, will break down. Therefore, response times can only be reduced to the extent that the electroactive polymer and/or accompanying electrolyte can support a high voltage or current.

Typically, an ionic electroactive polymer can sustain a high voltage or current only for a short time, until a certain charge has been consumed. Therefore, when using a high voltage or current to drive a device, the charge must be closely monitored. In addition, the speed of response does not keep increasing as the voltage or current is raised. Instead, the speed plateaus above a certain point. Therefore, using high voltages and/or currents to minimize response times has only limited utility.

The second commonly used method for decreasing response times of ionic electroactive polymers involves driving a device in resonance. Unfortunately, not all devices that include electroactive polymers can effectively be operated in such a manner. For example, resonance cannot be used to drive an actuator that controls an ON/OFF valve since, by definition, driving the actuator in resonance would cause the valve to "flap", as opposed to remaining in either the ON or OFF position.

SUMMARY OF THE INVENTION

In order to address and overcome at least some of the above-discussed shortcomings of the prior art, new ionic electroactive polymer structures and methods of forming the new structures are provided. Some of these structures and methods are summarized below.

According to certain embodiments of the present invention, a first structure is provided. This structure includes an ionic electroactive polymer with enhanced ion and/or mass transport conductivity in a first direction. This structure also includes a plurality (i.e., a number) of pores located within the electroactive polymer, wherein the pores are substantially perpendicular to the first direction and wherein at least one pore in the plurality of pores includes at least one section that is non-parallel to the first direction.

It should be noted that the first direction need not be the same throughout the polymer. It should also be noted that this first structure allows for an increase in the speed of response of the polymer by allowing ions and/or other mass rapid access to the first direction via the pores, as will be explained below.

According to other embodiments of the present invention, methods of manufacturing structures that include at least one ionic electroactive polymer are provided. According to such methods, an ionic electroactive polymer is formed that has enhanced ion and/or mass transport conductivity in a first direction. Also, a plurality of pores is formed within the electroactive polymer, and at least one pore in the plurality of pores includes at least one section that is non-parallel to the first direction.

According to yet other embodiments of the present invention, a second structure is provided. This second structure includes a matrix that itself includes an ionic electroactive polymer with enhanced ion and/or mass transport conductivity in a first direction. Also included within the matrix is a plurality of inclusions, wherein at least one inclusion in the plurality of inclusions includes a fast ion transporting polymer. In the second structure, the at least one inclusion itself includes a section that is non-parallel to the first direction.

BRIEF DESCRIPTION OF THE DRAWINGS

For proper understanding of the invention, reference should be made to the accompanying drawings, wherein:

FIG. 1 illustrates an ionic electroactive polymer according the prior art;

FIG. 3A illustrates a first structure that includes an ionic electroactive polymer and a plurality of pores that are oriented perpendicular to the upper and lower surfaces of the ionic electroactive polymer;

FIG. 3B illustrates how a pore allows for enhanced conductivity of ions in a polymer structure;

FIG. 4 illustrates an ionic electroactive polymer and a plurality of pores that are neither parallel to each other, identical, consistent in geometry, nor formed in a periodic array;

FIGS. 7A-7D illustrate the steps of forming a structure according to certain other embodiments of the present invention wherein an ionic electroactive polymer is formed around sacrificial posts and wherein the posts are subsequently removed to form pores in the ionic electroactive polymer.

DETAILED DESCRIPTION OF THE PREFERRED EMBODIMENT(S)

Figure 2A:
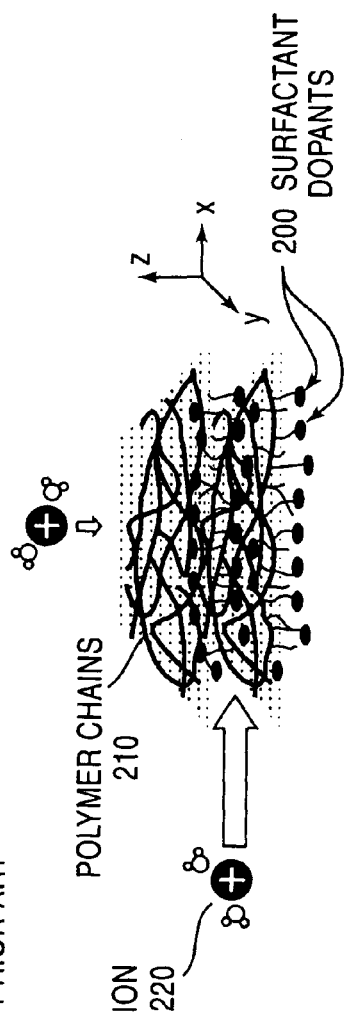
FIGS. 2A-C illustrate how surfactant dopants may cause layering of polymer chains within a polymer according to the prior art and also illustrate that ions may travel more easily in certain planes.
Figure 2C:
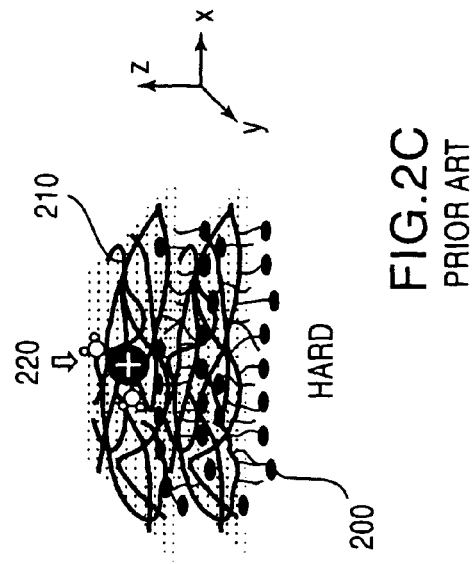
Figure 2B:
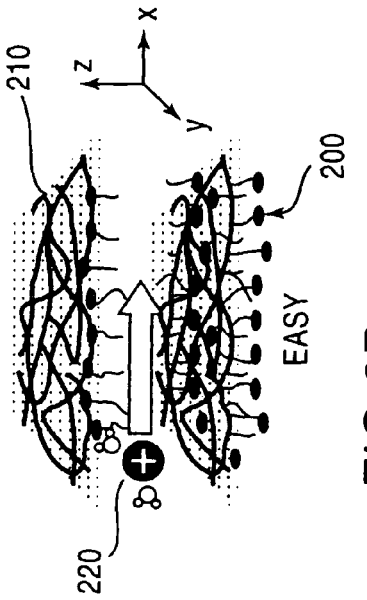

FIG. 3A illustrates structure 300 that includes electroactive polymer 310 which has enhanced ion or mass transport conductivity in a first direction and/or in a first set of planes. In FIG. 3A, the directions of enhanced conductivity are along the x- and y-axes, though these directions are not particularly limiting of the present invention. The planes of enhanced conductivity in FIG. 3A are the xy-plane and those parallel thereto, though these planes are not particularly limiting of the present invention either.

Structure 300 includes a plurality of pores 320 that are located within ionic electroactive polymer 310. As shown in FIG. 3A, at least one pore 320 within plurality of pores 320 includes at least one section that is non-parallel to the direction(s) or planes of enhanced conductivity. In the embodiment illustrated in FIG. 3A, each pore 320 is completely perpendicular to the first direction and extends along the z-direction from the top surface of electroactive polymer 310 to the bottom surface thereof. However, as will be shown in subsequent figures, the positioning and/or geometry of pores 320 may vary.

Electroactive polymer 310 may include, for example, any ionic electroactive polymer known to those of skill in the art. For example, ionic electoractive polymer 310 may include one or more conjugated polymers, ionic polymer metal composites (IPMCs), gels, and carbon nanotubes, as well as combinations thereof. According to certain preferred embodiments, the polymers, gels, and nanotubes are carbon-based. However, this is not particularly limiting of the present invention.

According to certain embodiments of the present invention, electroactive polymer 310 includes at least one member of at least one of the families including polypyrroles, polythiophenes, polyanalines, paraphenylenevinylene and polyacetylene. For example, poly(3-methyl thiophene) and poly-3,4-ethylenedioxythiophene may be included from the polythiophene family and/or poly(N-methyl pyrrole) may be included from the polypyrrole family. Also, electroactive polymer 310 may be doped with a surfactant. For example, dodecylbenzenesulfonate (DBS), an aromatic surfactant, may be used. Also, electroactive polymer 310 may be a composite that includes, for example, a conjugated polymer and carbon nanotubes. However, other ionic electroactive polymers may also be used according to the present invention.

Ionic electroactive polymer 310 has a morphology or chain or monomer alignment that facilitates mass transport and ionic conductivity in the first direction and/or in a first set of planes. In FIG. 3A, the x- and y-axes correspond to the directions of enhanced conductivity and are parallel to the upper surface of ionic electroactive polymer 310.

When polymer 310 is incorporated into a device, an ion source (e.g., an electrolyte) is typically adjacent to the top surface of polymer 310 illustrated in FIG. 3A. As such, one or more ions from the source may penetrate deeply into structure 300 through one or more of pores 320. Then, these ions may travel through electroactive polymer 310 along the directions of enhanced conductivity and/or in one of the planes of enhanced conductivity. Since, if pores 320 were not present in structure 300, these ions would only have been able to access these deeper planes by going through regions or planes of low ion or mass transport conductivity, pores 320 greatly increase the rate of ion or mass transport into the material. As a result, since the ions travel more quickly along these directions and/or these planes, the response time of electroactive polymer 310 is greatly reduced.

FIG. 3B illustrates how pore 320 allows for enhanced conductivity of ions 330 in structure 300. In particular, FIG. 3B illustrates that ions 330 that enter pore 320 are able to access planes of enhanced conductivity that are away from the top surface of structure 300. In contrast, ions 330 that do not enter pore 320 cannot access the lower planes of enhanced conductivity.

According to one embodiment of the present invention, structure 300 may be formed by electrochemically depositing a layer of PPy(DBS) from an aqueous solution of 0.1 M NaDBS and 0.1 M pyrrole (pH 7) at a constant potential of 0.47 V (vs. Ag/AgCl) with an EcoChemie pgstat30 to a thickness of 0.3 microns. When pores are formed in a structure manufactured according to this composition, ion velocities of approximately 70 micrometers/second can be obtained for a relatively low voltage (e.g., V<−1.6 V).

FIG. 4 illustrates structure 400 that includes ionic electroactive polymer 410, which has enhanced conductivity in the x-direction and/or xy-planes. As illustrated in FIG. 4, a plurality of pores 420 is included in ionic electroactive polymer 410. As also illustrated in FIG. 4, some of the pores 420 include sections that are non-perpendicular (i.e., slanted) relative to the x-direction and/or xy-planes of enhanced conductivity. As further illustrated on the right-hand side of FIG. 4, some of pores 420 have a tortuous geometry, meaning that they do not extend continuously in a single direction, but rather twist and turn. According to certain embodiments of the present invention, and as illustrated in FIG. 4, a combination of several or all of the types of pores discussed above may be included in a single composite structure, as may other pores whose orientations and geometries would be understood by those of skill in the art to enhance the operation of the present invention.

As illustrated in FIG. 4, pores according to the present invention need not be in a periodic arrangement, nor do they need to extend through the entire thickness of the ionic electroactive polymer in which they are included. However, according to certain embodiments of the present invention, the pores allow for ions to travel wherein they may travel in the direction and planes of enhanced conductivity. Therefore, in FIGS. 3 and 4, pores can extend to the top surfaces of structures 300 and 400. Pores, such as 430, that do not extend to the top surface, may also be included in the polymer that assist in ion transport once the ions have entered the polymer and made their way to such pores.

The diameters or, more generally, the perpendicular cross-sections of pores according to the present invention can be of a suitable scale to allow for ions to travel through the pores. Therefore, pores having diameters/cross-sections on the order of between one nanometer and one micrometer may be used, as may pores with even larger diameters/cross-sections. However, in order to maximize the amount of electroactive polymer present in a given volume relative to the porosity thereof, according to certain embodiments, it is possible to have pores with diameters/cross-sections on the order of between ten nanometers and one hundred nanometers.

Typically, the pores in structures according to the present invention are filled with an electrolyte that facilitates the flow of ions. However, no such requirement is particularly limiting of the present invention. For example, the pores may be filled with any gas, solid, or liquid that will allow for ions and/or other masses to reach and/or enter the electroactive polymer. Also, no particular temperature restrictions are imposed on the present invention, so long as the ionic electroactive polymer and electrolyte remain operational and stable.

Figure 5A:
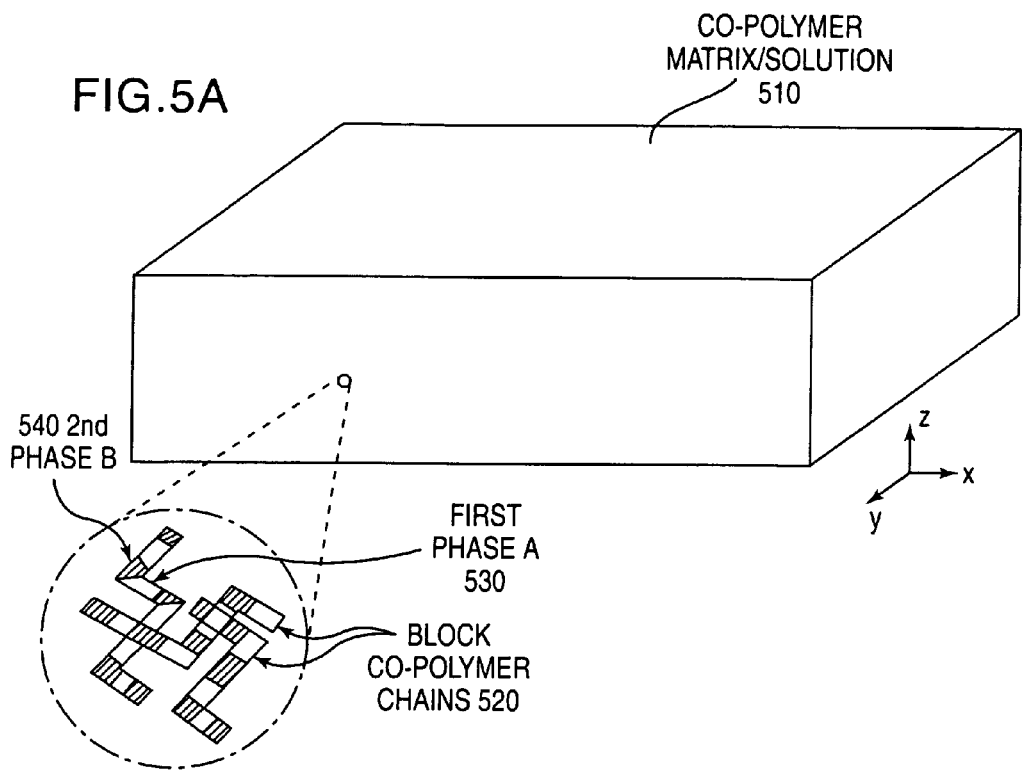
FIG. 5A illustrates a block co-polymer matrix/solution wherein the block co-polymer chains in the matrix/solution include two different phases.

FIG. 5A illustrates a volume that contains what may be either a co-polymer matrix or a co-polymer solution 510, depending on whether or not solvent is present in the volume. As illustrated in FIG. 5A, block co-polymer chains 520 are included in matrix/solution 510. Chains 520 are illustrated as including first-phase (A) blocks 530 and second-phase (B) blocks 540. However, additional phase blocks may also be included in co-polymer chains 520 according to certain embodiments of the present invention. Also, additional types of materials (e.g., fillers, stabilizers, etc.) may be included in matrix/solution 510.

Figure 5B:
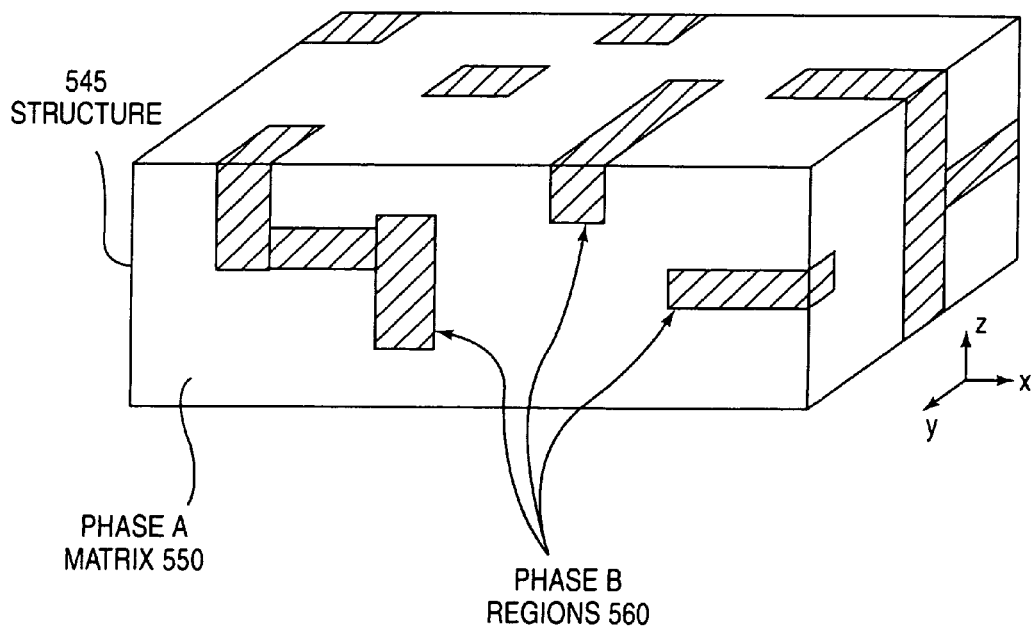
FIG. 5B illustrates a composite structure formed from the matrix/solution illustrated in FIG. 5A, wherein a first polymer phase has formed a matrix and wherein a second polymer phase has formed regions/inclusions in the matrix.

According to certain embodiments of the present invention, matrix/solution 510 is processed to generate composite structure 545 illustrated in FIG. 5B. For example, matrix/solution 510 may undergo evaporation of solvent, heating, UV irradiation, etc.

Upon processing of matrix/solution 510, the above-discussed first-phase (A) blocks 530 and second-phase (B) blocks 540 in co-polymer chains 520 separate from each other and aggregate into first-phase (A) matrix 550, which is illustrated in FIG. 5B as being continuous, and second-phase (B) regions 560. Such separation and aggregation may be stimulated by, for example, intermolecular forces between adjacent chains 520 as they come closer together as solvent evaporates from solution 510. In a more viscous or solid matrix, separation and aggregation may occur, for example, pursuant to heating matrix 510 and thereby providing the activation energy necessary for the separation and motion of blocks 530 and 540 in chains 520. Also, any other method known to those of skill in the art for forming an electroactive polymer-containing matrix with polymeric inclusions may also be used according to the invention.

According to certain embodiments of the present invention, regions 560 are analogous to the pores included in previously-discussed structures 300 and 400 at least in the sense that the one or more polymers that form regions 560 typically allow for fast ion transport therethrough. For example, regions 560 may function as a gel or solid polymer electrolyte.

Also analogous to the previously-discussed pores, regions 560 may be oriented such that they are non-parallel to the direction and/or planes of enhanced conductivity in matrix 550. They may be of similar geometry as the pores, and may be in periodic or non-periodic arrangements.

In view of the above description of composite structure 545, one of skill in the art will appreciate that, when an electric signal is applied to composite structure 545, ions or other masses that are adjacent to any surface of structure 545 can travel quickly into structure 545 through the fast-ion transporting material in regions 560. Then, the ions or masses may travel along the directions and planes of enhanced conductivity, thereby reducing the response time of the electroactive material. Alternatively, regions 560 may be readily removable through, for example, etching, thereby providing a method for producing pores.

Figure 6A:
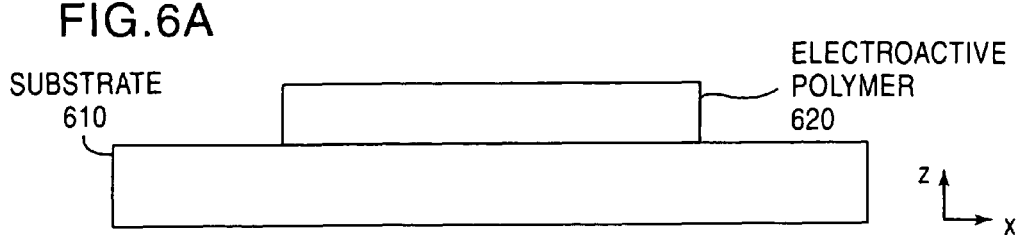
FIGS. 6A-6E illustrate the steps of a method of forming a structure according to certain embodiments of the present invention by masking an ionic electroactive polymer and etching a plurality of holes/pores therein.

FIGS. 6A through 6E illustrate the steps of a representative method according to the present invention for forming structures such as the ones discussed above. More specifically, FIG. 6A illustrates depositing or otherwise forming a layer or film of ionic electroactive polymer 620 on substrate 610. According to certain embodiments of the present invention, ionic electroactive polymer 620 may be formed as a bulk structure without substrate 610, typically by a casting or spinning process. However, as discussed previously, forming electroactive polymer 620 on substrate 610 typically promotes anisotropy in electroactive polymer 620 as polymer chains and/or nanotubes tend to orient themselves in a plane parallel to the surface of substrate 610 due to surface effects. Such anisotropy, as also discussed above, contributes to the enhanced conductivity along a first direction and set of planes in polymer 620. The use of certain conjugated polymer dopants such as DBS, discussed above, or p-toluene sulfonate (pTS) also enhances such anisotropy. According to certain embodiments, spinning electroactive polymer 620 promotes chain alignment parallel to the fiber direction and subsequent drawing further enhances this alignment.

Electroactive polymer 620 may be formed by casting, dipping, electrodeposition, spin coating, chemical vapor deposition, evaporation, spinning, electrospinning and/or any other technique known to those of skill in the art. However, for structures according to the present invention to be effective, it is preferred that a technique be chosen that avoids directions and/or planes of enhanced conductivity being perpendicular to the surface of substrate 610 upon which electroactive polymer 620 is deposited. After all, under such circumstances, the polymer would presumably already have a fast speed of response.

Figure 6B:
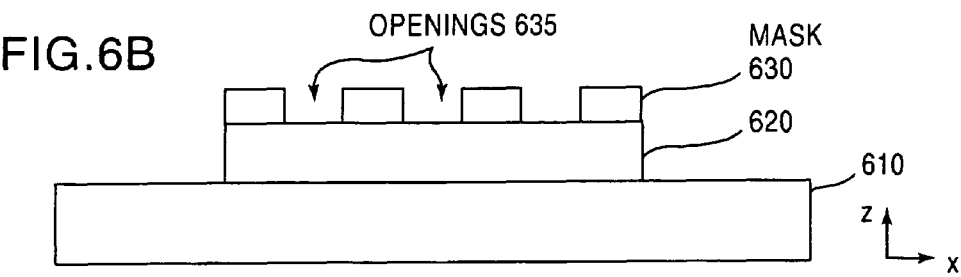

As illustrated in FIG. 6B, the upper surface of polymer 620 is masked with mask 630, which includes a set of openings 635. Mask 630 may, for example, be a polycarbonate track-etched nanoporous membrane. Such membranes are commercially available and provide openings 635 with diameters or cross-sections on the scale of anywhere from a couple of nanometers to the micrometer scale. As illustrated in FIG. 6B, openings 635 can be oriented perpendicular to the top surface of the film of polymer 620. However, other masks can also be used according to the present invention.

Figure 6C:
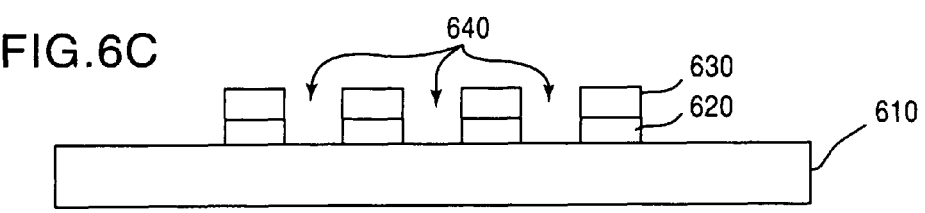

As illustrated in FIG. 6C, portions of electroactive polymer 620 that lie directly below the set of openings 635 in mask 630 are removed. This removal effectively forms a plurality of pores 640 in polymer 620. According to certain embodiments of the present invention, an oxygen plasma, or other plasma, in a reactive ion etching (RIE) system may be used to etch pores 640 using mask 630. However, neither RIE nor other plasma etching is required to implement methods according to the present invention, and any alternative method for forming holes in polymer 620 may be used. For example, chemical etching, laser ablation, focused ion bean machining, ion milling, electro-discharge machining, or other techniques may be used.

No particular restrictions are made on the thickness of the electroactive polymer layer illustrated in FIGS. 6A-6E. According to certain embodiments of the present invention, however, the thickness is chosen to allow for pores to be formed that extend throughout the thickness of the film.

Typically, each pore 640 includes at least one section thereof that is non-parallel to the direction and/or planes of enhanced conductivity. In FIG. 6C, this direction is along the x- and y-axes and these planes are those parallel to the xy-plane. However, the direction and planes of enhanced conductivity are not particularly limiting of the present invention as a whole.

Figure 6D:
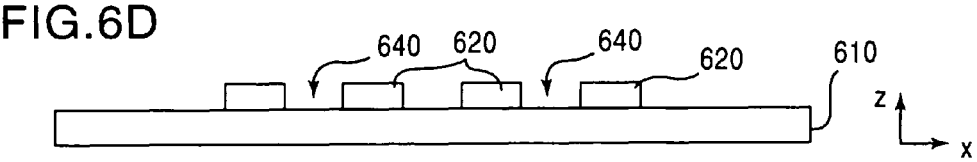
Figure 6E:
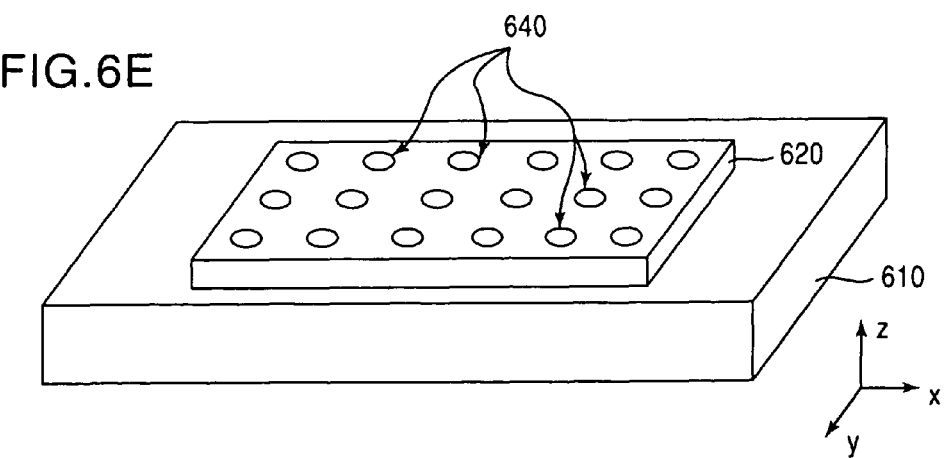

As illustrated in FIG. 6D, the mask may be removed. FIG. 6E then illustrates a perspective view of substrate 610, electroactive polymer 620, and pores 640 after mask 630 has been removed. As illustrated in FIG. 6E, the plurality of pores 640 were formed in a substantially periodic array. However, as discussed previously, periodicity is not required according to the present invention.

The pores 640 formed by the method illustrated in FIGS. 6A through 6E typically include at least one portion that is substantially perpendicular to the direction and planes of enhanced conductivity. However, the pores need not be formed to be perpendicular. Rather, with proper orientation of mask 630 and substrate 610, pores 640 may be slanted at an angle other than 90° relative to the top surface of substrate 610. Also, pores 640 need not be formed to extend through the entire thickness of electroactive polymer 620. Further, since it is not required that a periodic array be formed, nor that all the pores be of the same geometry, a wide variety of masks may be used according to the present invention. Typically, however, the pores are formed to have diameters/cross-sections that are on the order of between one nanometer and one micrometer or more, and can be formed to have diameters/cross-sections with dimensions on the order of between ten nanometers and one hundred nanometers.

FIGS. 7A through 7D illustrate another method for forming structures according to the present invention. As shown in FIG. 7A, substrate 710 is provided. Then, as illustrated in FIG. 7B, sacrificial posts 720 are formed on substrate 710. Sacrificial posts 720 may be formed by any method known to those of skill in the art and are not particularly limited in geometry or material composition. For example, a ceramic layer may be formed on substrate 710 and posts 720 may be formed by etching appropriate portions of the ceramic layer away.

FIG. 7C illustrates that electroactive polymer 730 has been deposited between and/or around sacrificial posts 720. Electroactive polymer 730 need not necessarily extend to the top of posts 720. In fact, according to certain embodiments of the present invention, the electroactive polymer does not cover posts 720, and posts 720 remain exposed. Posts 720 may be of virtually any geometry and need not be uniform in geometry.

FIG. 7D illustrates that sacrificial posts 720 have been removed, thereby leaving pores 740 in electroactive polymer 730. Any method known to those of skill in the art may be used to remove posts 720. For example, if silica posts are used, wet etching in hydrofluoric acid may be used.

The method illustrated in FIGS. 7A-7D again results in the formation of a structure that includes an electroactive polymer and pores that allow access to a direction and/or planes of enhanced conductivity. Thus, the structure again allows for fast response times of polymer 730. It will be appreciated by those skilled in the art that posts 720 may be formed at an angle to form slanted pores and that posts 720 need not be formed in a periodic array or to have uniform geometries.

One having ordinary skill in the art will readily understand that the invention as discussed above may be practiced with steps in a different order, and/or with structural configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A structure, comprising:
    an ionic electroactive polymer having morphological features that confer anisotropic ion or mass conductivity within the polymer due to enhanced ion conductivity or enhanced mass conductivity in a first direction, wherein the first direction is substantially parallel to a surface of the polymer and the first direction is a fast transport direction, wherein the mass comprises an atom or molecule, and wherein the ion comprises a charged atom or a charged molecule; and
    a plurality of pores located within the electroactive polymer, wherein the plurality of pores are substantially perpendicular to the first direction,
    wherein the plurality of pores comprise at least one of trenches, stripes, or cross-hatches.

2. The structure of claim 1, wherein the electroactive polymer comprises a conjugated polymer.

3. The structure of claim 2, wherein the electroactive polymer comprises a polymer selected from at least one family of polymers selected from among polypyrroles, polyanalines, polythiophenes, paraphenylenevinylene and polyacetylene.

4. The structure of claim 1, wherein the electroactive polymer comprises crystalline regions,
    wherein anisotropic conductivity is conferred upon the polymer.

5. The structure of claim 1, wherein, in the polymer,
    chains are aligned substantially in a plane or substantially parallel to a line to confer anisotropic conductivity upon the polymer, or
    monomer units of the chains are oriented, with no chain alignment, to confer anisotropic conductivity upon the polymer.

6. The structure of claim 1, wherein at least one pore in the plurality of pores extends from a surface of the polymer to an interior portion thereof.

7. The structure of claim 1, wherein the at least one pore in the plurality of pores is slanted relative to the first direction.

8. The structure of claim 1, wherein at least one pore in the plurality of pores has a diameter of between 1 nanometer and 1 micrometer.

9. The structure of claim 1, wherein at least one pore in the plurality of pores has a diameter of between 10 nanometers and 100 nanometers.

10. The structure of claim 1, wherein the electroactive polymer comprises a surfactant dopant.

11. The structure of claim 1, wherein the plurality of pores, which are located within the electroactive polymer, are configured to provide ions with access to the fast transport direction of the polymer.

12. A structure, comprising:
    a matrix including an electroactive polymer having morphological features that confer anisotropic ion or mass conductivity in the polymer due to enhanced ion conductivity or enhanced mass conductivity in a first direction, wherein the first direction is substantially parallel to a surface of the polymer and the first direction is a fast transport direction, wherein the mass comprises an atom or molecule, and wherein the ion comprises a charged atom or a charged molecule; and
    a plurality of inclusions included within the matrix, wherein at least one inclusion in the plurality of inclusions comprises a fast-ion transporting material, and wherein the plurality of inclusions are substantially perpendicular to the first direction.

13. The structure of claim 12, wherein the matrix comprises a conjugated polymer.

14. An apparatus, comprising:
    an ionic electroactive polymer that comprises at least one fast ion transport direction and a plurality of pores,
    wherein the fast ion transport direction is substantially parallel to a surface of the ionic electroactive polymer,
    wherein the plurality of pores are substantially perpendicular to the fast ion transport direction,
    wherein the plurality of pores are configured to provide ions with access to the fast ion transport direction of the ionic electroactive polymer, and
    wherein the plurality of pores comprise at least one of trenches, stripes, or cross-hatches.

15. The apparatus according to claim 14, wherein in the ionic electroactive polymer,
    polymer chains are aligned substantially in a plane or substantially parallel to a line to confer anisotropic conductivity upon the ionic electroactive polymer, or
    monomer units of the polymer chains are oriented, with no chain alignment, to confer anisotropic conductivity upon the ionic electroactive polymer.

16. The apparatus according to claim 14, wherein the plurality of pores are further configured to allow the ions or mass to have access to the morphological features that confer the anisotropic conductivity.

* * * * *